(12) United States Patent
Morel et al.

(10) Patent No.: US 11,156,334 B2
(45) Date of Patent: Oct. 26, 2021

(54) ILLUMINATION SYSTEM FOR AN AUTOMOTIVE VEHICLE

(71) Applicant: VALEO VISION, Bobigny (FR)

(72) Inventors: Xavier Morel, Bobigny (FR); Weicheng Luo, Bobigny (FR)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 15/721,072

(22) Filed: Sep. 29, 2017

(65) Prior Publication Data

US 2018/0086254 A1 Mar. 29, 2018

(30) Foreign Application Priority Data

Sep. 29, 2016 (FR) ..................................... 16 59347

(51) Int. Cl.
*F21S 41/153* (2018.01)
*B60Q 1/14* (2006.01)
(Continued)

(52) U.S. Cl.
CPC .......... *F21S 41/153* (2018.01); *B60Q 1/0076* (2013.01); *B60Q 1/04* (2013.01); *B60Q 1/14* (2013.01); *B60Q 1/143* (2013.01); *B60Q 1/1438* (2013.01); *B60Q 1/18* (2013.01); *B60Q 1/2607* (2013.01); *B60Q 1/50* (2013.01); *F21S 41/36* (2018.01); *G03B 21/008* (2013.01); *B60Q 1/34* (2013.01); *B60Q 2300/114* (2013.01); *B60Q 2300/312* (2013.01); *B60Q 2300/314* (2013.01); *B60Q 2300/41* (2013.01);
(Continued)

(58) Field of Classification Search
CPC .. B60Q 1/085; B60Q 1/0052; B60Q 2300/00; B60Q 2400/50
See application file for complete search history.

(56) References Cited

U.S. PATENT DOCUMENTS 1,658,668 A * 2/1928 Buttschau ............ B60Q 1/0052
362/308
6,736,524 B2 * 5/2004 Albou ...................... B60Q 1/14
362/228
(Continued)

FOREIGN PATENT DOCUMENTS

CN 2568942 Y 8/2003
CN 101932874 A 12/2010
(Continued)

OTHER PUBLICATIONS

J. Clark, "Headlights Part 2: Low/High Beams", Hot Rod Hotline (archived version of Aug. 28, 2016) (Year: 2016).*
(Continued)

*Primary Examiner* — David N Werner
(74) *Attorney, Agent, or Firm* — Oblon, McClelland, Maier & Neustadt, L.L.P.

(57) ABSTRACT

The present invention relates to an illumination system for a vehicle, including at least a first projection device for projecting at least one pixelated light source defining at least a first projection envelope and at least a second projection device for projecting at least one pixelated light beam defining at least a second projection envelope and configured to project at least one pictogram, wherein at least a first projection envelope and the at least a second projection envelope have at least one area of overlap.

14 Claims, 3 Drawing Sheets

(51) Int. Cl.

| | | |
|---|---|---|
| *B60Q 1/04* | (2006.01) | |
| *B60Q 1/18* | (2006.01) | |
| *B60Q 1/00* | (2006.01) | |
| *B60Q 1/26* | (2006.01) | |
| *B60Q 1/50* | (2006.01) | |
| *G03B 21/00* | (2006.01) | |
| *F21S 41/675* | (2018.01) | |
| *F21S 41/663* | (2018.01) | |
| *B60Q 1/34* | (2006.01) | |
| *F21S 41/36* | (2018.01) | |

(52) U.S. Cl.
CPC ...... *B60Q 2300/42* (2013.01); *B60Q 2300/45* (2013.01); *B60Q 2400/50* (2013.01); *F21S 41/663* (2018.01); *F21S 41/675* (2018.01)

(56) References Cited

U.S. PATENT DOCUMENTS

| | | | | |
|---|---|---|---|---|
| 8,439,536 | B2 * | 5/2013 | Sato | F21S 41/663 |
| | | | | 362/510 |
| 8,935,055 | B2 * | 1/2015 | Raghunathan | B60Q 1/085 |
| | | | | 701/49 |
| 9,500,333 | B1 * | 11/2016 | Johnson | B60R 13/005 |
| 10,126,640 | B2 * | 11/2018 | Mizuno | F21S 41/645 |
| 10,195,980 | B2 * | 2/2019 | Widdowson | B60Q 1/50 |
| 10,214,141 | B2 * | 2/2019 | Yatsu | H04N 9/3194 |
| 10,794,719 | B2 * | 10/2020 | Kunii | B60Q 1/085 |
| 2002/0053878 | A1 * | 5/2002 | Masaki | B60Q 1/26 |
| | | | | 315/82 |
| 2004/0189447 | A1 | 9/2004 | Okubo et al. | |
| 2008/0198372 | A1 | 8/2008 | Pan | |
| 2010/0302794 | A1 * | 12/2010 | Oomen | F21V 7/0025 |
| | | | | 362/519 |
| 2013/0021810 | A1 * | 1/2013 | Funk | F21S 41/153 |
| | | | | 362/464 |
| 2013/0058116 | A1 * | 3/2013 | Galbas | B60Q 1/085 |
| | | | | 362/512 |
| 2014/0321145 | A1 * | 10/2014 | Anzai | F21S 41/24 |
| | | | | 362/516 |
| 2015/0137965 | A1 * | 5/2015 | Lanham | B60Q 1/2607 |
| | | | | 340/479 |
| 2015/0267889 | A1 * | 9/2015 | Toko | G02F 1/1506 |
| | | | | 362/467 |
| 2016/0116666 | A1 * | 4/2016 | Sato | G02B 6/002 |
| | | | | 362/509 |
| 2016/0227616 | A1 * | 8/2016 | Lee | H05B 45/37 |
| 2016/0363270 | A9 * | 12/2016 | Giametta | B60Q 1/0052 |
| 2017/0129394 | A1 * | 5/2017 | Salter | F21V 23/003 |
| 2017/0334345 | A1 * | 11/2017 | Yokoyama | F21S 43/26 |
| 2018/0236926 | A1 * | 8/2018 | Lee | B60Q 1/30 |
| 2018/0259156 | A1 * | 9/2018 | Hechtfischer | G03B 21/2013 |

FOREIGN PATENT DOCUMENTS

| | | | | |
|---|---|---|---|---|
| CN | 102371937 A | | 3/2012 | |
| CN | 105976642 A | | 9/2016 | |
| DE | 10 2015 201 766 A1 | | 8/2016 | |
| EP | 1 433 654 A2 | | 6/2004 | |
| EP | 2993389 A3 * | | 10/2016 | ............... B60Q 1/50 |
| FR | 2987796 A1 * | | 9/2013 | ........... B60Q 1/0052 |
| JP | 2013232405 A * | | 11/2013 | ........... B60Q 1/0011 |
| WO | WO 2014/119980 A1 | | 8/2014 | |
| WO | WO-2015063023 A1 * | | 5/2015 | ........... B60Q 1/0052 |
| WO | WO-2016070961 A * | | 5/2016 | ........... B60Q 1/0052 |

OTHER PUBLICATIONS

C. Atiyeh, "2015 Audi A8 Can Spot Animals", Car and Driver (Jul. 3, 2013), https://www.caranddriver.com/news/a15369420/2015-audi-a8-can-spot-animals-not-coming-stateside-with-matrix-leds/ (Year: 2013).*

French Preliminary Search Report dated Jul. 25, 2017 in French Application 16 59347, filed on Sep. 29, 2016 (with English Translation of Categories of cited documents).

Chinese Office Action issued in Chinese Patent Application No. 2017109146549 dated Nov. 30, 2020, (w/ English Summary).

* cited by examiner

ILLUMINATION SYSTEM FOR AN AUTOMOTIVE VEHICLE

TECHNICAL FIELD OF THE INVENTION

The present invention relates, notably, to an illumination system. A preferred application concerns the automotive industry, for vehicle equipment, in particular for the provision of devices capable of emitting light beams, also called illumination functions, which generally conform to regulations. The emission of beams ahead of the vehicle is of particular relevance.

PRIOR ART

Up to the present time, known illumination and signaling devices have been designed in order to emit, for example, a low beam, a high beam, an illumination beam for foggy weather, and a signaling beam.

The low beam must provide both good quality illumination and an absence, or reduction, of the annoyance to surrounding vehicles caused by the luminous flux produced. At present, low beam headlights are essentially designed for this purpose, use being made, in particular, of cut-offs, which may be complex, at the top of the beam, in order to limit precisely, or prevent, illumination above the horizon line, and to design in the best way an area of light projection that is to be prohibited because it may annoy the driver of an oncoming vehicle.

Existing high beams also have similar drawbacks, namely very poor resolution and degrees of freedom limited by their technology. Although improvements have been proposed for high beams, for example the use of two identical devices for strip illumination, this does not solve the problem of the resolution that this type of technology can achieve.

The appearance of high-resolution systems of the micromirror array type, known in English as a digital micromirror device (DMD), enables these limitations to be reduced, and the US document 2002/0196636 is a good example of this.

Here again, however, this type of system has many drawbacks, since it is desirable to adapt the projection of light beams to specific and variable external conditions. In fact, there is an inherent limitation on the existing technology, due to the choice between illumination power and illumination resolution. Existing high-resolution systems cannot provide the illumination characteristics of low-resolution systems, and it is difficult for low-resolution systems to achieve the visual quality of DMD systems. Thus there is a real need for dynamic, adaptive light projection systems.

The invention lies within this context.

BRIEF DESCRIPTION OF THE INVENTION

The present invention relates to an illumination system for a vehicle, comprising at least a first device for projecting at least one pixelated light source defining at least a first projection envelope and at least a second device for projecting at least one pixelated light beam defining at least a second projection envelope, and configured to project at least one pictogram, characterized in that said at least a first projection envelope and said at least a second projection envelope have at least one area of overlap.

The present invention provides many degrees of freedom for an illumination system for a vehicle, enabling the readability of the road projection to be improved compared with the prior art: contrast management, higher resolution and higher precision.

Additionally, and advantageously, the present invention improves the uniformity in the interface of the projection envelopes produced by the two projection devices.

The coupling of a pixelated light source (a low beam with a plurality of areas, for example) with at least one pixelated beam (of the DMD type for example) to form projection envelopes that can be superimposed on one another in positive or negative form, so that projection can preferentially take place equally well in either positive or negative mode, provides a considerable improvement in the readability of road projection, in a dynamic manner, in relation to the visibility conditions of the user.

According to a particularly advantageous variant, the contrast profile of the projected pictogram is reinforced relative to the average lighting environment of the background beam on which, or in which, the pattern is included.

This is because the present invention has a large number of degrees of freedom allowing adaptation to many situations as regards the visibility conditions as well as the relevance and management of the information to be projected.

Thus the present invention makes it possible to improve visibility and the response of the eye to projected information, notably when this information relates to safety. The present invention allows the contrast, and therefore the visibility, to be increased, thereby reducing the user's reaction time and consequently the braking distance, which thus increases driving safety.

To this end, for example, the edges of the pictogram, from the outside of the latter toward the inside, and in at least one dimension (width or height) of the pictogram projection plane, may show an alternation of at least two areas whose intensity differs from the average intensity of the background beam, a first area having a higher or lower intensity than this average intensity, and the second area having, respectively, a lower or a higher intensity than this average intensity. In a variant embodiment, the second area forms the core or central area of the pictogram and is then bordered in at least one dimension by the first area.

Thus the perception by the driver or by a third party of the message formed by the projected pictogram is reinforced, the reaction time with respect to the projected message is reduced, and driving safety is thereby improved.

For example, in certain circumstances, the information in the pictogram may be more important than the illumination of an area of the road, whereas, in other circumstances, it is preferable to maintain very good illumination of the road while projecting a less important pictogram onto the road.

By using a high-resolution beam in combination with a lower-resolution beam, it is possible to project a pictogram with one beam while controlling the illumination of the pictogram projection area with the other. It is then possible to control directly not only the contrast but also the brightness of the pictogram, on the basis of the user's visual comfort, for example, or on the basis of any other condition.

The applied intensity gradient and intensity level may be constant, or may vary along the pattern in one direction of the projection dimension concerned (the width or the height, for example from the left to the right or from the top to the bottom, respectively, corresponding to a near field projection from the vehicle toward the horizon).

Furthermore, this variation may be static or dynamic; that is to say, it may be controlled on the basis of the vehicle's environment: for example, on the basis of the imminence of an event, the contrast may be reduced or reinforced dynamically so as to generate an effect of undulation of the patter which will appear more or less sharp in the background beam, and to draw the attention of the driver or of third parties to the imminence of the event corresponding to the projected pictogram (an exit arrow or turn arrow, a collision alert, a pedestrian crossing the road, etc.).

The present invention thus improves driving safety even further.

The present invention thus makes it possible to couple in an ingenious way the advantages of two light sources whose pixelation differs, in order to meet all illumination requirements.

This is because the present invention proposes the use of the advantages of two different technologies in order to combine the advantages of each in the same illumination system.

The present invention also relates to a vehicle equipped with at least one system according to the present invention.

Such a vehicle provides comfortable reading of the road projection for its driver, as well as intelligent management of the projected information in relation to environmental parameters, for example.

The present invention also relates to an illumination method for a vehicle, comprising at least one illumination system according to the present invention, said method comprising at least the following steps:

Measurement of at least operating parameter by at least one sensor;

Reception of said measurement by at least one electronic control unit;

Sending, by means of said at least one electronic control unit, of at least a first signal for activating and/or deactivating at least a part of an array of lighting elements contained in at least a first projection device;

Sending, by means of said at least one electronic control unit, of at least a second signal to at least a second projection device, for projecting at least one pictogram selected from among a plurality of pictograms in at least one database on the basis of said at least one measurement.

Such a method allows the present invention to be used in a computer system comprising at least one processor, instructions contained in at least one non-transient memory, and at least one sensor of an external parameter, for example an environmental or position parameter.

BRIEF DESCRIPTION OF THE DRAWINGS

The purposes, objects, characteristics and advantages of the invention will be more fully apparent from the detailed description of an embodiment of the invention which is illustrated by the following accompanying drawings, in which.

The appended drawings are provided by way of example, and do not limit the invention. These drawings are schematic representations and are not necessarily to the scale of the practical application.

In order to represent the present invention in a simple and schematic manner, FIGS. 2, 3, 4 and 5 represent only one case of application of the present invention, corresponding to road illumination originating from the center of the vehicle and not from the sides, in order to simplify the graphic representation of the drawings. The present invention is, naturally, applicable to the case of a vehicle equipped with an illumination system directed ahead of the vehicle on the right and/or on the left, relative to the axis of the main dimension of the vehicle.

DETAILED DESCRIPTION OF THE INVENTION

In the following description, similar reference numerals will be used to describe similar concepts, based on different embodiments of the invention.

Unless specified otherwise, technical characteristics described in detail for a given embodiment may be combined with the technical characteristics described in the context of other embodiments described by way of example and in a non-limiting way.

As a general rule, the present invention may use light sources of the light-emitting diode type, also commonly called LEDs. Notably, these LEDs may be equipped with at least one chip capable of emitting light whose intensity is advantageously adjustable according to the illumination and/or signaling function to be provided. There may be a plurality of sources, as described more fully below. Furthermore, the term "light source" is here taken to mean a set of at least one elementary source such as an LED, capable of producing a flux causing an output light beam, executing at least one desired function, to be generated at the output of the device of the invention. LED sources are particularly advantageous for the production of arrays and for strip illumination. Other types of source could also be considered for use in the invention, such as one or more laser sources, notably for micromirror devices.

In the characteristics described below, the terms relating to verticality, horizontality and transversality, or their equivalents, are to be interpreted with reference to the position in which the illumination system is intended to be fitted in a vehicle. The terms "vertical" and "horizontal" are used in the present description to denote directions following an orientation perpendicular to the plane of the horizon for the term "vertical", and following an orientation parallel to the plane of the horizon for the term "horizontal". They are to be considered in the conditions of operation of the device in a vehicle. The use of these words does not mean that small variations around the vertical and horizontal directions are excluded from the invention. For example, an inclination of about + or −10° relative to these directions is considered here as a minor variation around the two predominant directions.

The term "low" or "lower part" is generally taken to refer to a part of an element of the invention located below the optical axis along a vertical plane. The term "high" or "upper part" is generally taken to refer to a part of an element of the invention located above the optical axis along a vertical plane. The term "parallel" or the concept of coincident axes or lines is to be interpreted here, notably, with manufacturing or assembly tolerances, and substantially parallel directions or substantially coincident axes are included in this context.

In the following description, the term "array" is taken to mean a table comprising a certain number of rows and a certain number of columns. Thus an array called (n, p) is a table with n rows and p columns. An array is then called square if its number of rows is equal to its number of columns. An array is called vertical if its number of rows is greater than its number of columns. An array is called horizontal if its number of rows is less than its number of columns. In the present description, a row is taken to be advantageously horizontal according to the definition of this term given above, and a column is taken to be advantageously vertical according to the definition of this term given above.

The term "pixelated light source", or its equivalents, are defined as a light source comprising a plurality of light-emitting devices, such as an array of LEDs, each light-emitting device being controllable independently of the other light-emitting devices. Thus there is a plurality of light sources forming a pixelated light source.

The term "pixelated light beam", or its equivalents, are defined as a light beam formed by a plurality of light sub-beams, each light sub-beam being controllable independently of the other light sub-beams. This type of pixelated light beam may be formed, for example, by micromirror array systems, liquid crystal devices, or a technology of digital light processing (DLP) (as it is known in English), or alternatively by one or more pixelated light sources, so that, for example, the color of the pixelated light beam or beams can be controlled. Each independently controllable sub-beam forms a pixelated ray. Unlike a pixelated light source, a pixelated light beam may comprise a single light-emitting device instead of a plurality.

The terms "envelope", "projection envelope", or their equivalents, are defined as a virtual surface defining a volume of space comprising one or more light beams emitted from a single projection device. Thus each projection device has a corresponding projection envelope in which the beam or beams to be projected are inscribed.

A projection surface, or area, is defined as a surface delimited by the intersection between a projection envelope and some scenery (surrounding the vehicle, such as a part of the road surface or shoulder), for example the scenery facing the vehicle. Thus a projection area is defined as the surface that may be illuminated by a given projection device.

The term "overlap ratio", or its equivalents, are defined as the ratio of the surface or area common to two projection envelopes that may be illuminated, or of the volume common to two projection envelopes that may be illuminated, to the smaller total surface or the smaller total volume corresponding to one or other of the projection envelopes. This ratio is equal to 100% if the smaller surface or area that can be illuminated by one of the two projection devices is totally incorporated in the surface that can be illuminated by the other projection device. This overlap ratio is therefore in the range from 0% to 100%.

The term "pictogram" or its equivalents are taken to mean a figurative or symbolic design or pattern reproducing the content of a message without relation to its linguistic form; thus it may mean an arrow, a symbol obtained from the highway code, an icon, or any other shape representative of an item of information. For example, a pictogram may thus be informative, or more functional, for example lines reconstructed by the illumination, but it may also take more cognitive forms.

Before the detailed description of embodiments of the invention is commenced, some optional characteristics which may be used in association, or alternatively, are stated below:

Said at least a second projection device is configured to project said at least one pictogram in at least one positive projection mode corresponding to the luminous projection of an inner area of said at least one pictogram.

This enables what is called a positive projection mode to be provided, in which the second projection envelope corresponds to the pictogram. Additionally, by controlling the first projection device, it is possible to combiner this positive projection mode with the illumination or non-illumination of a projection area of the first projection envelope, in order to control more precisely the display contrast and quality of the pictogram.

Said at least a first projection device is configured to interact with said at least a second projection device so as to produce the illumination of at least a part of said at least one overlap area when said at least one pictogram is projected by said at least a second projection device in said at least one positive projection mode.

Said at least a first projection device is configured to interact with said at least a second projection device so as to produce reduced illumination, or preferably an absence of illumination, of at least a part of said at least one overlap area relative to the illumination of the inner area of said at least one pictogram, when said at least one pictogram is projected by said at least a second projection device in said at least one positive projection mode, while producing illumination in at least a part of said at least a first projection envelope outside the inner area of said at least one pictogram.

Said at least a second projection device is configured to project said at least one pictogram in at least one negative projection mode corresponding to the luminous projection of an outer area of said at least one pictogram.

This makes it possible to provide a projection mode called negative, in which the periphery of the pictogram is projected. Additionally, by controlling the first projection device, it is then possible to combiner this negative projection mode with the illumination or non-illumination of a projection area of the first projection envelope, in order to control more precisely the display contrast and quality of the pictogram.

Said at least a first projection device is configured to interact with said at least a second projection device so as to produce the illumination of at least a part of said at least one overlap area when said at least one pictogram is projected by said at least a second projection device in said at least one negative projection mode.

Said at least a first projection device is configured to interact with said at least a second projection device so as to produce reduced illumination, or preferably an absence of illumination, of at least a part of said at least one overlap area relative to the illumination of the outer area of said at least one pictogram, when said at least one pictogram is projected by said at least a second projection device in said at least one negative projection mode, while producing illumination in at least a part of said at least a first projection envelope outside the outer area of said at least one pictogram.

Said at least a first projection device is configured so as to illuminate or not illuminate certain projection areas of said at least a first projection envelope. This makes it possible to illuminate, or not illuminate, certain areas of the road, and thus provide an additional degree of freedom allowing the adjustment of the visibility of the pictogram projected on an area according to whether the latter is or is not illuminated, while the projection of the pictogram may be either positive or negative.

Said at least a first projection device comprises at least one array of lighting elements configured to form said at least one pixelated light source.

This makes it possible to provide a plurality of light sources defining an array, so as to divide the projection envelope of the first projection device into a plurality of projection areas.

Said at least one array of lighting elements is an array in which the number of columns is greater than or equal to the number of rows.

Said at least one array of lighting elements comprises at least 2 lighting elements, preferably at least 8 lighting elements, and advantageously at least 100 lighting elements.

Said lighting elements of said at least one array are configured to be individually controlled.

This makes it possible to provide a plurality of light sources defining an array, so as to divide the projection envelope of the first projection device into projection areas.

Said at least a second projection device comprises at least a first array of micromirrors configured to form said at least one pixelated light beam from at least one light source.

This makes it possible to provide a highly pixelated light beam and thus to project a pictogram and/or the periphery of a pictogram, according to whether the positive or negative projection mode is used.

Said at least a second projection device comprises at least a second array of micromirrors.

This makes it possible to provide two highly pixelated light beams, of which one may be used for projecting a pictogram for example, and the other may be used for projecting low beams for example, or alternatively for increasing the resolution and/or the size of a projected pictogram, or for projecting two pictograms simultaneously.

Said at least a first array of micromirrors and said at least a second array of micromirrors are configured to form said at least one pixelated light beam.

This makes it possible to increase the resolution of the projected pictogram.

Said at least a first array of micromirrors and said at least a second array of micromirrors are configured to form, respectively, at least a first pixelated light sub-beam and at least a second pixelated light sub-beam, said at least a first pixelated light sub-beam and said at least a second pixelated light sub-beam being configured to form said at least one pixelated light beam.

This makes it possible to provide two highly pixelated light beams, of which one may be used for projecting a pictogram for example, and the other may be used for projecting low beams for example.

Said at least one overlap area correspond to an overlap ratio between said at least a first projection envelope and said at least a second projection envelope in the range from 0% to 100%, advantageously from 30% to 70%, and preferably equal to 50%.

The number of pixels of said at least one pixelated light source is less than the number of pixels of said at least one pixelated light beam.

This makes it possible to provide an illumination system having the advantages of a weakly pixelated light source and a highly pixelated beam. The power and precision are therefore available to provide good visibility of the projected pictograms, in a dynamic manner in relation to the visibility conditions for the driver.

The ratio between the number of pixels of said at least one pixelated light source and the number of pixels of said at least one pixelated light beam is less than 200, preferably equal to 50, and advantageously equal to 3.

The ratio between the number of pixels of said at least one pixelated light source and the number of pixels of said at least one pixelated light beam is in the range from 200 to 3, preferably in the range from 50 to 3, and advantageously equal to 50.

Said at least a first projection device and said at least a second projection device each comprise an output optical surface.

This enables the output optical surface to be adapted to the optical characteristics of the device concerned.

Said at least a first projection device and said at least a second projection device have a common output optical surface.

This makes it possible to design a compact and simple illumination system.

Said at least a first projection device is controlled by an electronic control unit so that said at least one pixelated light source is controlled according to at least one operating parameter.

The electronic control unit thus enables full use to be made of the degrees of freedom provided by the present invention.

Said at least a second projection device is controlled by an electronic control unit so that said at least a second projection envelope is modified according to at least one operating parameter.

This electronic control unit makes it possible to modify the reflective properties of the array of micromirrors so as to adapt them to the illumination requirements.

Said at least a second projection device is controlled by an electronic control unit so that said at least one pictogram is modified according to at least one operating parameter.

Said at least one operating parameter is at least one parameter chosen from among: detection of a change in direction of the road, detection of a location data element, detection of precipitation, detection of the brightness of the road environment, detection of a vehicle ahead, detection of an oncoming vehicle, detection of imminent danger, detection of an object crossing the path of the vehicle (a pedestrian or animals, for example), detection of an area of road works, detection of road signs, detection of deceleration, detection of an accident, detection of weather conditions, detection of other road users.

This makes it possible to control projection devices to be controlled on the basis of external parameters, and thus to optimize the display of pictograms on the road according to the road conditions, as well as to define the type of pictogram to be projected, also on the basis of the road conditions, for example.

Said at least one pictogram is chosen from among an arrow, a word, horizontal or vertical lines, animated patterns, and dynamic projections.

This enables various types of information to be displayed on the road, to be received by the user and also by any person capable of viewing the pictogram.

The preferred field of application of the present invention is the automotive industry, for vehicle equipment, in particular for the provision of illumination devices.

This is because the present invention provides greater precision and more degrees of freedom in road projection. At the present time, road projection is increasingly promoted by many automotive equipment manufacturers. The new technology developed in recent years makes it possible to project onto the road information intended for the driver as well as for other users. As discussed above, however, the existing solutions, while having advantages over earlier illumination technology, also have poorer performance in other fields, in situations where road projection is unnecessary for example, or when visibility conditions make it difficult to read the road projection of existing systems.

Thus, with the aim of overcoming at least some of these drawbacks, the present invention advantageously proposes an ingenious illumination system benefiting from the advantages of a plurality of technologies, combined together in an innovative architecture to provide all the functions that may be required in an illumination system, while offering additional degrees of freedom to conform with the conditions of visibility, readability and driving.

It is never a simple matter to reconcile old and new technology, and the present invention proposes a solution which is both novel and inventive, in order to meet the illumination requirements of the past, present and future.

The present invention will now be described by means of FIGS. 1 to 5, which serve as non-limiting examples to illustrate certain embodiments of the present invention.

Figure 1:
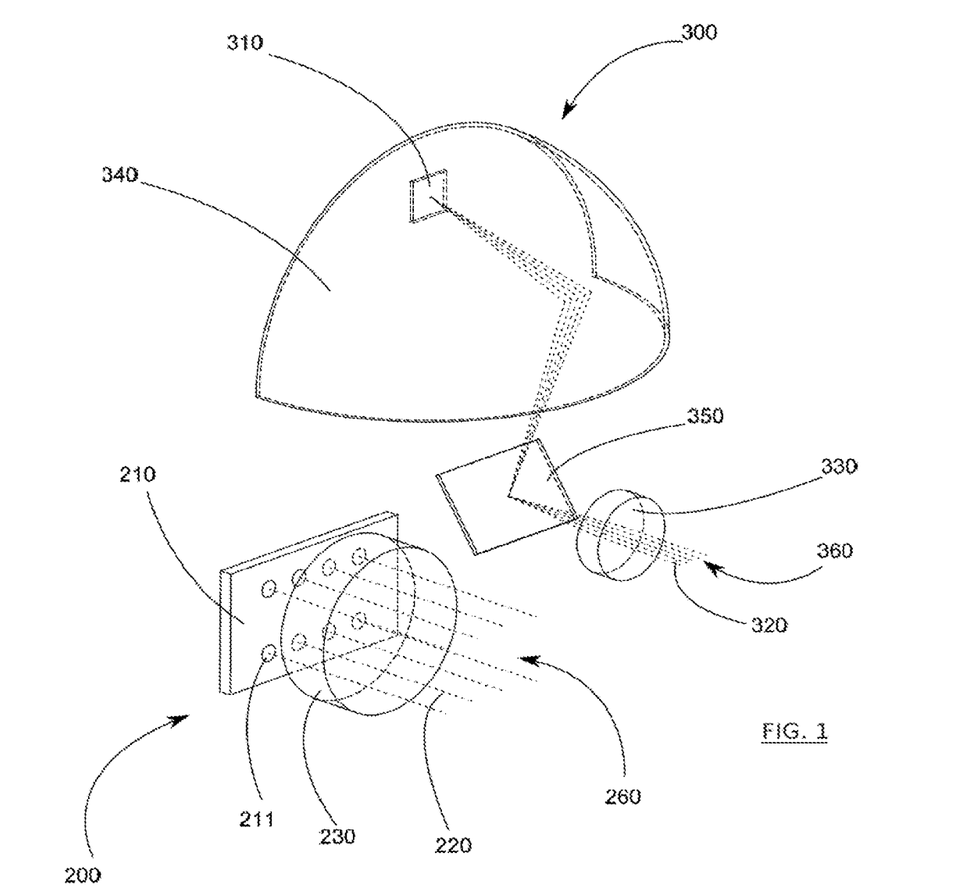
FIG. 1 shows an illumination system according to an embodiment of the present invention, comprising a first projection device 200 and a second projection device 300.

FIG. 1 shows, according to an embodiment of the present invention, a first projection device 200 of a pixelated light source 220, and a second projection device 300 of a pixelated light beam 320.

In the present invention, as mentioned above, a pixelated light source is distinguished from a pixelated light beam in that the pixelation of the pixelated light source is due to the fact that it comprises a plurality of light emitters, whereas, conversely, the pixelation of the pixelated light beam is due to the fact that it comprises a plurality of light beams, even if this plurality of light beams originates from a single non-pixelated light source.

As shown by the embodiment of FIG. 1, the first projection device 200 may comprise at least one array 210 of lighting elements 211 and at least one output optical surface 230 configured to shape the pixelated light 220 emitted by the array 210 of lighting elements 211 so as to define a first projection envelope 260. Advantageously, this output optical surface 330 may be a converging lens, for example.

Advantageously, the lighting elements 211 are LEDs or any other types of light emitters, preferably individually controllable.

According to one embodiment, the length of the array 210 of lighting elements 211, that is to say the number of columns that it contains, is in the range from 2 to 100, preferably in the range from 10 to 50, and advantageously equal to 10.

According to one embodiment, the width of the array 210 of lighting elements 211, that is to say the number of rows that it contains, is in the range from 2 to 100, preferably in the range from 10 to 50, and advantageously equal to 10.

Preferably, the array 210 of lighting elements 211 is a horizontal array, that is to say one in which the number of columns is greater than the number of rows.

According to one embodiment, the pixelated light source may also comprise, or be formed by, separate modules, each consisting of a light source, each having its own output optical surface and each being independently controllable.

Preferably, each lighting element 211 of the array 210 is individually controllable by an electronic control unit on the basis of at least one operating parameter. This control may consist in the variation of the luminous intensity, which may be zero, produced by one or more lighting elements 211, or the positioning of a shield or any type of element capable of reducing the brightness of the light produced by one or more lighting elements 211, and/or capable of interrupting the path of the light from one or more lighting elements 211 toward the output optical surface 230, or more generally toward the outside of the vehicle. The control of the array 210 is described in the following part of the present description.

Advantageously, the control of the array 210 makes it possible to shape the first projection envelope 260, and consequently a first projection area. This is because the control of the array 210 makes it possible to produce illumination and/or reduced illumination, or even an absence of illumination, of at least a part of the first projection area delimited by the first projection envelope 260. Thus it is possible, for example, to extinguish or diminish the luminous intensity of the lighting elements 211 of the array 210 so as to reduce or even cut off the illumination of only a portion of the projection envelope 260, and therefore of the projection area. In FIGS. 2 to 5, the illuminated area of the first projection envelope 260 is given the reference 261, while the area of lower illumination, or even of non-illumination, of the first projection envelope 260 is given the reference 271, and may be defined by a projection sub-envelope 270.

The present invention makes it possible, by means of this control, to illuminate or not to illuminate certain parts of the scenery or of the landscape facing the vehicle, for example.

As shown by the embodiment of FIG. 1, the second projection device 300 may comprise at least one DMD, that is to say a micromirror device, also called a micromirror array 350, at least one output optical surface 330 configured to shape the pixelated light beam 320 formed by the micromirror array 350 so as to define a second projection envelope 360.

This second projection device 300 comprises at least one light source 310, which may be, for example, at least one LED or at least one laser diode, or any kind of light source. This light source 310 emits a light beam, advantageously toward a reflector 340. This reflector 340 is preferably configured to concentrate the incident light flux on a surface comprising the array of micromirrors 350.

Advantageously, the reflector 340 is configured so that the set of micromirrors 350 are illuminated by the light beam reflected by the reflector 340. The reflector 340 may have a pseudo-elliptic or pseudo-parabolic profile in at least one section plane.

According to one embodiment, the length of the array of micromirrors 350, that is to say the number of columns that it contains, is in the range from 2560 to 864, preferably in the range from 2560 to 864, and advantageously equal to 1150.

According to one embodiment, the width of the array of micromirrors 350, that is to say the number of rows that it contains, is in the range from 1600 to 480, preferably in the range from 1150 to 480, and advantageously equal to 1150.

After being reflected by at least some of the micromirrors 350, the light beam passes through an output optical surface 330. Advantageously, this output optical surface 330 may be a converging lens, for example.

As mentioned, after the reflection of the light beam from the reflector 340, the beam is concentrated on the array of micromirrors 350. Preferably, the micromirrors each have two operating positions, namely a position called the active position, in which they reflect the incident light beam toward the output optical surface 330, and a position called the passive position, in which they reflect the incident light beam toward an element, not shown in FIG. 1, which absorbs light radiation. Preferably, each micromirror of the array of micromirrors 350 is individually controllable by an electronic control unit on the basis of at least one operating parameter. The control of the array of micromirrors 350 is described in the following part of the present description.

This second projection device 300 makes it possible to provide a highly resolved and pixelated light beam at the output of the output optical surface 330, so that each pixel or pixelated ray composing this beam corresponds to a micromirror, and these micropixels can then be activated or not activated simply by controlling the micromirrors 350. This feature then makes it possible to control the shape of the light beam at the output of the output optical surface 330 as desired, according to the requirements of the invention.

Advantageously, the present invention makes it possible to provide road projection, in the form of the projection of a pictogram 370 in the driver's field of view. This projection may be provided on the road 400, at the side of the road, and above or below the horizon, by way of non-limiting example. The control of the micromirrors 350 makes it possible to produce high-resolution pictograms 370, the resolution of the pictogram 370 being directly equal to the number of micromirrors 350 activated, that is to say in the active position, for its production.

When the second projection device 300 is used to project a pictogram 370, some of the micromirrors are in the passive position and others are in the active position.

The expression "positive projection mode" is taken to mean the case in which the inner area 371 of the pictogram 370 corresponds to the micromirrors in an active position and the outer area 361 of the pictogram 370 corresponds to the micromirrors in a passive position. This means that only the inside of the pictogram 370 is projected by the second projection device 300, and the second projection envelope 360 is thus shaped to define only the pictogram 370, and therefore has a non-illuminated area corresponding to the outer area 361 of the pictogram 370. This situation is shown particularly clearly in FIGS. 2 and 4, described in the following part of the description.

The expression "negative projection mode" is taken to mean the case in which the outer area 361 of the pictogram 370 corresponds to the micromirrors in an active position and the inner area 371 of the pictogram 370 corresponds to the micromirrors in a passive position. This means that only the periphery of the pictogram 370 is projected by the second projection device 300, and the second projection envelope 360 is thus shaped to define only the pictogram 370, and therefore has a non-illuminated area corresponding to the inner area 371 of the pictogram 370. This situation is shown particularly clearly in FIGS. 3 and 5, described in the following part of the description.

In a particularly advantageous manner, the highly dynamic nature of the micromirrors 350 and their high density enable high-resolution pictograms 370 to be rapidly formed. Each micromirror in the active position is a pixel of the projected pictogram 370, whether it is in positive mode relative to the inner area 371 of the pictogram 370, or in negative mode relative to the outer area 361 of the pictogram 370.

These two modes are discussed at greater length and illustrated hereafter in FIGS. 2 to 5.

According to one embodiment, the second projection device 300 comprises a first array of micromirrors and a second array of micromirrors. These two arrays of micromirrors are, for example, configured to form, respectively, at least a first pixelated light sub-beam and at least a second pixelated light sub-beam.

Advantageously, the first pixelated light sub-beam and the second pixelated light sub-beam are configured to form said pixelated light beam 320.

According to one embodiment, each of the two arrays of micromirrors has an output optical surface.

According to another embodiment, the two arrays of micromirrors have at least one output optical surface in common.

The use of two arrays of micromirrors gives the present invention many additional degrees of freedom. This is because this second array of micromirrors may enable the following situations, for example, to be provided:

The first array of micromirrors may serve to project pictograms while the second array of micromirrors may be used to project low beams;
The two arrays of micromirrors may be used jointly to provide larger pictograms;

An offset between the pixelated light sub-beams may be applied, together with color or polarization filters, so as to produce a three-dimensional pictogram, each sub-beam acting as the reference for a different eye of the user;

Each of the two arrays of micromirrors may project a different pictogram from the other;

Each of the two arrays of micromirrors may occupy half of the projection space 260, regardless of whether this is in the horizontal or vertical dimension;

Each of the two arrays of micromirrors may project a different color, for example a white beam and a color beam which is advantageously green.

According to a preferred embodiment of the present invention, the first projection envelope 260 defined by the pixelated light source 220, and the second projection envelope 360 defined by the pixelated light beam have at least one area of overlap with one another. This overlap may be defined in two equivalent representations, of which one is three-dimensional and the other is two-dimensional.

The three-dimensional approach consists in defining the overlap area as a volume of space belonging to the volume of space defined by the first projection envelope 260, while also belonging to the volume of space defined by the second projection envelope 360.

The two-dimensional approach consists in illustrating this overlap area as a two-dimensional surface, which in fact is a surface illuminated by both the first projection device 200 and the second projection device 300.

Advantageously, this overlap area is located at the center of the larger illuminated area between the area illuminated by the first projection device 200 and the area illuminated by the second projection device 300.

The overlap ratio, according to its definition given above, is therefore in the range from 100% to 0%, preferably from 60% to 20%, and advantageously from 50% to 30%.

Preferably, the first projection device 200 illuminates a larger area than the area illuminated by the second projection device 300.

According to a preferred embodiment, the whole of the projection envelope 360 of the second projection device 300 is included in the projection envelope 260 of the first projection device 200. The overlap ratio is then equal to 100%.

According to one embodiment, the first projection device 200 and the second projection device 300 use a common output optical surface. This embodiment enables the present illumination system to be made more compact and robust.

We shall now describe FIGS. 2 to 5 which show, according to an embodiment of the present invention, four situations in which a pictogram 370 is projected by the second projection device 300 in interaction with the first projection device 200.

Figure 2:
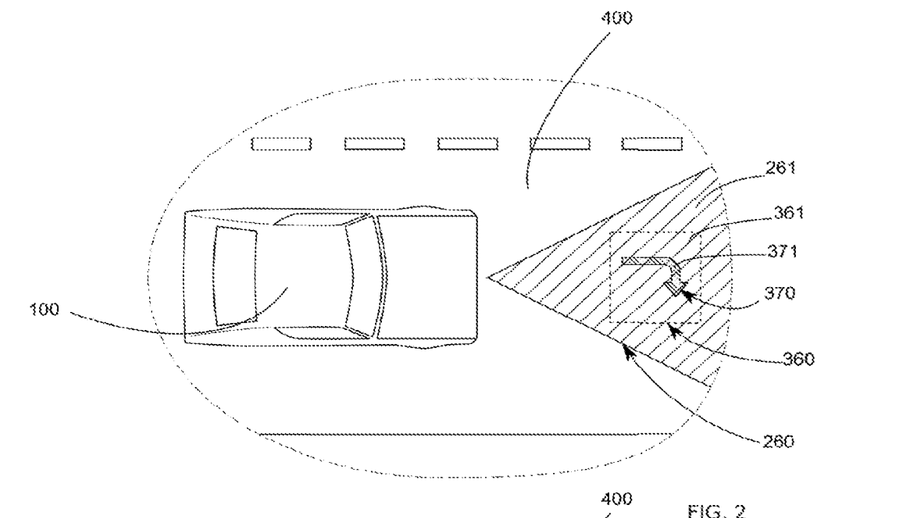
FIG. 2 shows, according to an embodiment of the present invention, the projection of a pictogram 370 by the second projection device 300 in a positive projection mode in an area 261 illuminated by the first projection device 200. In this figure, the inner area 371 of the pictogram 370 is said to be projected by overprinting with the first projection envelope 260 of the first projection device 200, and the outer area 361 of the pictogram 370 is said to be projected by "underprinting", since it is not really projected. The second projection envelope 360, generated by the second device 200, is thus shaped to define only the pictogram 370, and therefore has a non-illuminated area corresponding to the outer area 361 of the pictogram 370.

In FIG. 2, the vehicle 100, traveling on a road 400, comprises a first projection device 200 and a second projection device 300.

The projection area 261 is the total projection surface that can be illuminated by the first projection device 200; this area is defined by the first projection envelope 260.

The total projection area defined by the addition of areas 361 and 371 is the total projection surface that can be illuminated by the second projection device 300; this area is defined by the second projection envelope 360.

FIG. 2 shows the case of a positive mode of projection of a pictogram 370 by the second projection device 300. This is therefore a situation in which the inner area 371 of the pictogram 370 is projected by the second device 300, and in which the outer area 361 of the pictogram 370 is not projected; that is to say it is not illuminated.

In the case of FIG. 2, the overlap ratio of the overlap of the projection area 261 of the first projection device 200 with the inner area 371 of the pictogram 370 is equal to 100%. This is because the pictogram 370 is entirely projected in the projection area 261 of the first projection device 200.

As mentioned above, and as described below, the first projection device 200 can be controlled to form areas of reduced illumination or even non-illumination.

The situation shown in FIG. 2 corresponds to a projection in positive mode of a pictogram 370 by the second device 300 in the projection area 261 illuminated by the first device 200. The pictogram 370 is projected on an area which is already illuminated.

Thus this embodiment enables the present invention to project a pictogram 370 in an area 261 which is already illuminated, so that the illumination of the road 400 is not lost while information in the form of a pictogram 370 is projected there.

This situation may, for example, be particularly useful in the case where the projected pictogram 370 is a pictogram corresponding to information of lesser importance relative to the illumination of the road 400, or in the case where the weather conditions are such that this is the most suitable embodiment for enabling the driver to view the projected pictogram 370 correctly.

For example, the pictogram 370 may be an arrow pointing ahead of the vehicle 100 so as to reinforce the illumination of the road 400 in a precise area to enable the driver to concentrate particularly on this area.

The pictogram 370 may have the function of displaying information, and also of reinforcing the illumination in a particular geometric shape so that the driver's concentration on this area of the road 400 is increased.

Figure 3:
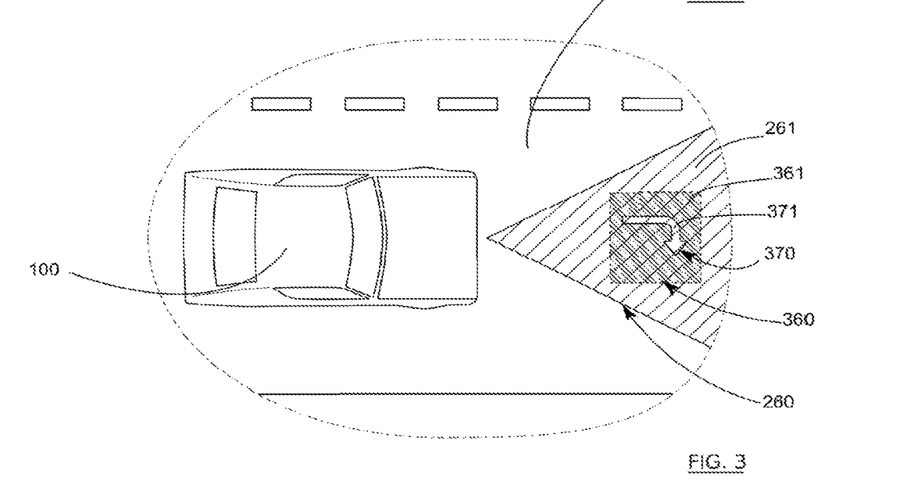
FIG. 3 shows, according to an embodiment of the present invention, the projection of a pictogram 370 by the second projection device 300 in a negative projection mode in an area 261 illuminated by the first projection device 200. In this figure, the outer area 361 of the pictogram 370 is said to be projected by overprinting with the first projection envelope 260 of the first projection device 200, and the inner area 371 of the pictogram 370 is said to be projected by "underprinting", since it is not really projected. The second projection envelope 360, generated by the second device 200, is thus shaped to define only the perimeter of the pictogram 370, and therefore has a non-illuminated area corresponding to the inner area 371 of the pictogram 370.

FIG. 3 shows the case of a negative mode of projection of a pictogram 370 by the second projection device 300. This is therefore a situation in which the outer area 361 of the pictogram 370 is projected by the second device 300, and in which the inner area 371 of the pictogram 370 is not projected; that is to say it is not illuminated.

In the case of FIG. 3, the overlap ratio of the overlap of the projection area 261 of the first projection device 200 with the outer area 361 of the pictogram 370 is equal to 100%. This is because the periphery of the pictogram 370 is entirely projected in the projection area 261 of the first projection device 200.

The situation shown in FIG. 3 corresponds to a projection in negative mode of a pictogram 370 by the second device 300 in the projection area 261 illuminated by the first device 200. The negative image of the pictogram 370 is projected on an area which is already illuminated.

Thus this embodiment enables the present invention to project a negative image of a pictogram 370 in an area which is already illuminated, so that the illumination of the road 400 is not lost while information in the form of a pictogram 370 is projected there.

As in the case of FIG. 2, this situation may, for example, be particularly useful in the case where the pictogram 370 projected in negative is a pictogram corresponding to information of lesser importance relative to the illumination of the road 400, or in the case where the weather conditions are such that this is the most suitable embodiment for enabling the driver to view the projected pictogram 370 correctly, in the negative projection mode.

In some situations of illumination of the road 400, due either to the weather or to the public illumination of the road 400, the projection of the pictogram 370 in negative mode may give the driver better visibility of the pictogram 370 and/or of the inner area of the pictogram 370.

Figures 4, 5:
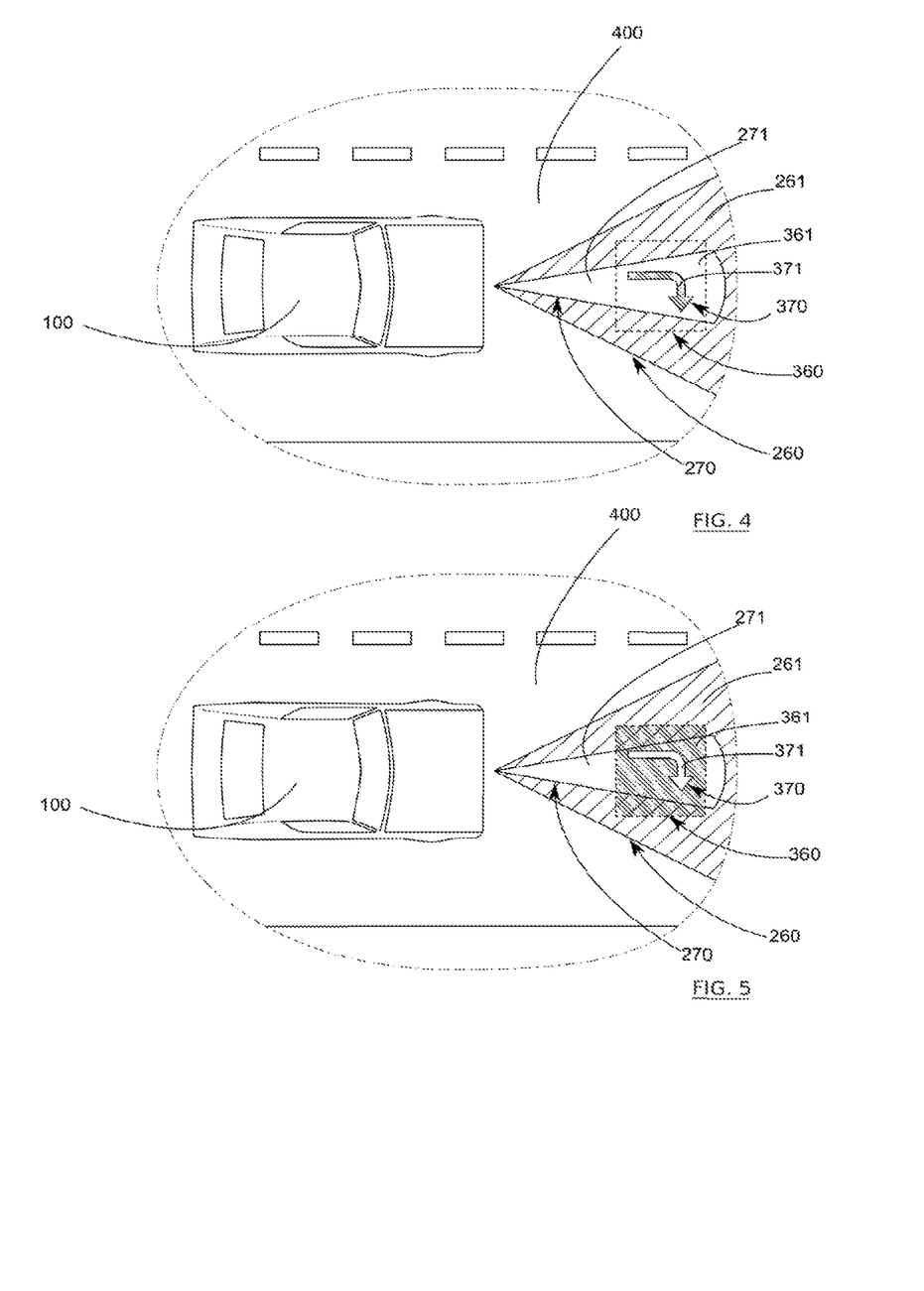
FIG. 4 shows, according to an embodiment of the present invention, the projection of a pictogram 370 by the second projection device 300 in a positive projection mode in an area 271 not illuminated by the first projection device 200, in other words in an area of lower illumination, or even non-illumination, of the first projection envelope 260 of the first projection device 200. The area 271 is defined by a projection sub-envelope 270 generated by the first projection device 200, and belongs to the first projection envelope 260. In this figure, the inner area 371 of the pictogram 370 is illuminated by the second projection device 200. The second projection envelope 360, generated by the second device 200, is thus shaped to define only the pictogram 370, and therefore has a non-illuminated area corresponding to the outer area 361 of the pictogram 370.
FIG. 5 shows, according to an embodiment of the present invention, the projection of a pictogram 370 by the second projection device 300 in a negative projection mode in an area 271 not illuminated by the first projection device 200, in other words in an area of lower illumination, or even non-illumination, of the first projection envelope 260 of the first projection device 200. The area 271 is defined by a projection sub-envelope 270 generated by the first projection device 200, and belongs to the first projection envelope 260. In this figure, the outer area 361 of the pictogram 370 is illuminated by the second projection device 200. The second projection envelope 360, generated by the second device 200, is thus shaped to define only the perimeter of the pictogram 370, and therefore has a non-illuminated area corresponding to the inner area 371 of the pictogram 370.

In FIG. 4, the vehicle 100, traveling on a road 400, comprises a first projection device 200 and a second projection device 300.

As before, the projection area 261 is the total projection surface that can be illuminated by the first projection device 200; this area is defined by the first projection envelope 260.

However, in the case of FIG. 4, a projection area 271 of reduced illumination, or preferably non-illumination, defined by the sub-envelope 270, is shown. This projection area 271 of non-illumination is an area of illumination in which the corresponding lighting elements 211 of the first projection device 200 are controlled so as to reduce the brightness of the light that they emit, or even to cut it off, for example. If the light emission of these light emitters is cut off, by electronic and/or mechanical means, the projection area 271 has no illumination. The projection sub-envelope 270 then defines a dark area in the projection area 261 of the first projection device 200.

Advantageously, the projection area 271 may be any of the areas belonging to the projection area 261 defined by the first envelope 260. This is because the first envelope 260 defines a volume containing the sub-envelope 270 defining the projection area 271.

Thus the projection area 271, at its smallest, may be equal to zero, and at its largest it may be equal to the projection area 261.

As in the case of FIG. 2, the total projection area defined by the addition of areas 361 and 371 is the total projection surface that can be illuminated by the second projection device 300.

In FIG. 4, in a similar way to the preceding FIG. 2, the projection mode is a positive mode of projection of a pictogram 370 by the second projection device 300. This is therefore a situation in which the inner area 371 of the pictogram 370 is projected by the second device 300, and in which the outer area 361 of the pictogram 370 is not projected; that is to say it is not illuminated.

In the case of FIG. 4, the overlap ratio of the overlap of the projection area 261 of the first projection device 200 with the inner area 371 of the pictogram 370 is equal to 0%. This is because the pictogram 370 is entirely projected in the projection area 271 of the first projection device 200, corresponding to the area of non-illumination.

If the projection area 271 were simply an area of reduced illumination, the overlap ratio would again be equal to 100%. In the case of FIG. 4, however, the area 271 is not illuminated by the first projection device 200.

As mentioned above, the first projection device 200 can be controlled so as to form non-illuminated areas.

The situation shown in FIG. 4 corresponds to a projection in positive mode of a pictogram 370 by the second device 300 in the projection area 271 not illuminated by the first device 200. The pictogram 370 is projected on an area which is not illuminated by the first projection device 200.

Thus this embodiment enables the present invention to project a pictogram 370 in a dark area so as to reinforce its contrast and make the pictogram 370 much more visible to the driver.

This situation may, for example, be particularly useful in the case where the projected pictogram 370 is a pictogram corresponding to information of high importance relative to the illumination of the road 400, or in the case where the weather conditions are such that this is the most suitable embodiment for enabling the driver to view the projected pictogram 370 correctly.

For example, the pictogram 370 may be an arrow pointing to the right relative to the vehicle 100 so as to indicate precisely to the driver that he must turn right at the next intersection. This information may also be an indication of the authorized speed, for example in order to tell the driver to reduce his speed according to regulations.

For example, a location system of the vehicle 100 may determine the position of the vehicle 100 relative to a section of the road 400, and may detect the speed regulations, for example, from a database, and project information on these regulations in the form of pictograms 370 for the driver.

FIG. 5 shows the case of a negative mode of projection of a pictogram 370 by the second projection device 300. As in the case of FIG. 3, this is the situation in which the outer area 361 of the pictogram 370 is projected by the second device 300, and in which the inner area 371 of the pictogram 370 is not projected; that is to say it is not illuminated.

In the case of FIG. 5, the overlap ratio of the overlap of the projection area 261 of the first projection device 200 with the outer area 361 of the pictogram 370 is equal to 0%. This is because the periphery of the pictogram 370 is entirely projected in the projection area 271 not illuminated by the first projection device 200.

The situation shown in FIG. 5 may also correspond to a projection in negative mode of a pictogram 370 by the second device 300 in the projection area 271 of reduced illumination.

Thus this embodiment enables the present invention to project a negative image of a pictogram 370 in a non-illuminated area of the road so as to reinforce its contrast and make the pictogram 370 much more visible to the driver.

As in the case of FIG. 4, this situation may, for example, be particularly useful in the case where the pictogram 370 projected in negative is a pictogram corresponding to information of high importance relative to the illumination of the road 400, or in the case where the weather conditions are such that this is the most suitable embodiment for enabling the driver to view the projected pictogram 370 correctly, in the negative projection mode.

In some situations of illumination of the road 400, due either to the weather conditions or to the public illumination of the road 400, the projection of the pictogram 370 in negative mode may give the driver better visibility of the pictogram 370 and/or of the inner area of the pictogram 370.

Advantageously, the present invention is configured so as to allow a dynamic change from one embodiment of the present invention to another. For example, the present invention allows a dynamic change between any one of the embodiments shown in FIGS. 2, 3, 4 and 5.

Four different situations of projection of a pictogram 370 have now been described by means of FIGS. 2 to 5. It is one of the advantages of the present invention that the projection of a pictogram 370 can be adapted on the basis of various operating parameters.

A non-limiting description of the control of the first and second projection device will now be given.

According to one embodiment, the first projection device 200 is controlled by an electronic control unit. Advantageously, the electronic control of the first projection device 200 consists in the shaping of the first projection envelope 260.

For example, this control makes it possible to reduce the illumination of part of the projection area 261, or even not to illuminate a part of this projection area 261.

This control may be provided directly at the array 210 of lighting elements 211, by reducing the light emission of some of the lighting elements 211, or by stopping the light emission of some of the lighting elements 211.

This control may also be provided by introducing a filter, or possibly an opaque shield, between some of the lighting elements 211 and the projection area 261, before or after the output optical surface 230.

Advantageously, the first projection device 200 is controlled by an electronic control unit so that the pixelated light source is controlled according to at least one operating parameter. This operating parameter will be described in the following part of this description.

The electronic control unit makes it possible to control the first projection device 200 so as to create areas of illumination and/or areas of reduced illumination and/or non-illuminated areas.

The pixelated light source 220 of the first projection device 200 is controlled by the electronic control unit so that each pixel composing said pixelated light source is controlled either individually or otherwise.

According to another embodiment, the second projection device 300 is controlled by an electronic control unit. Advantageously, the electronic control of the second projection device 300 consists in the shaping of the projection envelope 360.

For example, this control makes it possible to reduce the illumination of part of the projection area 360, or even not to illuminate a part of this projection area 360.

This control may be provided directly at the array of micromirrors 350, by placing some of the micromirrors in an active or passive position.

This control may also be provided by introducing a filter, or possibly an opaque shield, between some of the micromirrors and the projection area 360, before or after the output optical surface 330.

Advantageously, the reflective properties of the micromirrors of the array of micromirrors 350 may be controlled by the electronic control unit.

According to another embodiment, this electronic control may also be provided upstream of the array of micromirrors 350, at the light source of the second projection device 300 for example, or alternatively at the reflector 340. This control may, for example, be a reduction of the luminous intensity of the light source 310 of the second projection device 300.

Advantageously, the second projection device 300 is controlled by an electronic control unit so that the projected pictogram 370, as well as its projection mode (positive or negative) is controlled according to at least one operating parameter.

Preferably, the first projection device 200 and the second projection device 300 are controlled by the same electronic control unit. This provides greater compactness of the control system as well as better interaction between the first projection device 200 and the second projection device 300 in their control.

The operating parameter or parameters affecting the control of the first projection device 200 and/or the control of the second projection device 300 will now be described.

Advantageously, the operating parameter is a plurality of operating parameters, such as preprogrammed environmental parameters or user parameters.

According to one embodiment, some operating parameters may be based on measurements made by sensors, for example meteorological sensors, position sensors, speed sensors, brightness sensors, cameras, radar, lidar, GPS (Global Position System), data streams, RSS streams, Wi-Fi, Smartphone, Cloud data, and others.

The operating parameters may be of different types, for example environmental parameters which may relate to road visibility, weather conditions, etc., and preprogrammed parameters such as those obtained from on a database of pictograms, the vehicle navigation system, the power system, the communication system, etc.

According to one embodiment, the operating parameters may be interdependent; for example "wet road" information may result in the selection of a specific pictogram from a database of pictograms so that the array of micromirrors is modified, for example, and the pictogram corresponding to the identified situation is projected, while the projection envelope of the first projection device is adapted as required.

Advantageously, the environmental parameters may be measured by sensors which may or may not be incorporated in the vehicle, or may be obtained directly from computer data via a communications network such as the internet.

Preferably, the preprogrammed parameters are obtained from the vehicle management system, and include, for example, the speed indicator, the position of the vehicle relative to a destination, etc.

According to one embodiment, the operating parameter may be a geopositioning parameter, such as the detection of a change of direction of the road, or of the route to be followed. For example, if the driver uses a GPS navigator, the present invention may be configured so that the pictogram 370 projected by the second projection device 300 is an indication of the road to be followed, an arrow for example, a distance, or any other element enabling the driver to be guided without taking his eyes off the road.

According to another embodiment, the operating parameter may be a location data element, such as a distance between the vehicle and a destination, or alternatively the distance between the vehicle and the vehicle in front.

According to yet another embodiment, the operating parameter may be at least one meteorological parameter. The present invention may, for example, detect particular climatic conditions and indicate them to the driver via pictograms projected ahead of the vehicle, and also adapt the projection of said projected pictograms automatically, on the basis of said measured and/or determined conditions.

The electronic control unit advantageously enables all the degrees of freedom of the present invention to be controlled.

In a particularly advantageous manner, the present invention comprises many degrees of freedom in the projection of pictograms on the road, so that it is possible to make automatic preferential adaptations to many highly variable visibility conditions. There is a very wide dynamic range available in respect of the contrast, as well as the precision, of the projected pictogram, to meet the requirements of the widest range of visibility conditions.

The present invention is adaptable equally well to the visibility conditions and to the type of pictograms projected, so that the visibility of the pictogram can be adapted on the basis of the driver's visibility conditions as well as on the importance and content of the information indicated by said pictogram.

The present invention also relates to an illumination method for a vehicle. This method preferably comprises at least the following steps:
  Measurement of at least operating parameter by at least one sensor;
  Reception of said measurement by at least one electronic control unit;

Sending, by means of said at least one electronic control unit, of at least a first signal for activating and/or deactivating at least a part of an array 210 of lighting elements 211 contained in at least a first projection device 200;

Sending, by means of said at least one electronic control unit, of at least a second signal to at least a second projection device 300, for projecting at least one pictogram 370 selected from among a plurality of pictograms in at least one database on the basis of said at least one measurement.

Thus the present invention allows a complete adaptation of its illumination system on the basis of multiple conditions and parameters, so as to provide the driver with the best visibility of the pictogram according to its significance relative to the road conditions.

According to one embodiment, the present invention benefits from a particular pixelation ratio between the first projection device 200 and the second projection device 300. This is because, advantageously, the first projection device comprises at least 1 lighting element 211, preferably at least 8 lighting elements, and advantageously at least 50 lighting elements.

Preferably, the array of micromirrors 350 comprises at least 42,000 micromirrors, preferably at least 1,200,000 micromirrors, and advantageously at least 4,096,000 micromirrors.

According to one embodiment, the pixelated light source may also comprise, or be formed by, separate modules, each consisting of a light source, each having its own output optical surface and each being independently controllable.

According to one embodiment, the number of lighting elements 211 of the first projection device 200 is less than the number of micromirrors of the second projection device 300.

Thus this makes it possible to provide an illumination system having the advantages of a weakly pixelated light source and a highly pixelated beam. Thus the present invention has the necessary power and precision to provide good visibility of the projected pictograms, in a dynamic manner in relation to the visibility conditions for the user, and in relation to the nature of the pictograms. The system described may be incorporated wholly or partially into a headlight unit, notably on the front of the vehicle. The system may comprise elements divided into at least two groups of elements, each of the groups of elements being positioned on a different side of the optical axis. For example, a first group comprises a first projection device and a second projection device in a headlight unit on one side of the vehicle, and a second group comprises a first device in a headlight unit on the other side of the vehicle; the beams from the first device preferably converge toward the optical axis. The second group may also include a second device for displaying pictograms, in addition or as an alternative to the projection of the second device of the first group of elements. One or more groups of elements may comprise additional projection means, for example for providing other illumination functions, such as a high beam.

According to an embodiment that may be provided separately, the contrast profile of the projected pictogram is reinforced relative to the average lighting environment of the background beam on which, or in which, the pattern is included.

To this end, the edges of the pictogram, from the outside of the latter toward the inside, and in at least one dimension (width or height) of the pictogram projection plane, show an alternation of at least two areas whose intensity differs from the average intensity of the background beam, a first area having a higher or lower intensity than this average intensity, and the second area having, respectively, a lower or a higher intensity than this average intensity. In a variant embodiment, the second area forms the core or central area of the pictogram and is then bordered in at least one dimension by the first area.

Thus the perception by the driver or by a third party of the message formed by the projected pictogram is reinforced, the reaction time with respect to the projected message is reduced, and driving safety is thereby improved.

The applied intensity gradient and intensity level may be constant, or may vary along the pattern in one direction of the projection dimension concerned (the width or the height, for example from the left to the right or from the top to the bottom, respectively, corresponding to a near field projection from the vehicle toward the horizon). Furthermore, this variation may be static or dynamic; that is to say, it may be controlled on the basis of the vehicle's environment: for example, on the basis of the imminence of an event, the contrast may be reduced or reinforced dynamically so as to generate an effect of undulation of the patter which will appear more or less sharp in the background beam, and to draw the attention of the driver or of third parties to the imminence of the event corresponding to the projected pictogram (an exit arrow or turn arrow, a collision alert, a pedestrian crossing the road, etc.). Thus this particular embodiment improves driving safety even further.

In a particularly advantageous way, this variation of gradient may be provided by the control of the device for projecting the pixelated light beam.

For example, if a DMD is used, this variation of gradient can be provided by controlling the micromirrors. The latter may be placed in intermediate positions between the active and the passive position. These intermediate positions may, for example, be coded on 8 bits; that is to say, 255 gray levels are allowed. It is thus possible to adjust the gray level, and therefore the gradient, by adjusting the time spent by the micromirrors in these intermediate states.

The invention is not limited to the embodiments described, but extends to any embodiment according to the spirit of the invention.

REFERENCES

100. Vehicle;
200. First projection device;
210. Array of lighting elements;
211. Lighting element;
220. Pixelated light;
230. Output optical surface of the first projection device;
260. First projection envelope;
261. Illuminated area of the first projection envelope;
270. Projection sub-envelope;
271. Non-illuminated area of the first projection envelope, defined by the projection sub-envelope 270;
300. Second projection device;
310. Light source of the second projection device;
320. Pixelated beam;
330. Output optical surface of the second projection device;
340. Reflector;
350. Array of micromirrors;
360. Second projection envelope;
361. Outer area of the pictogram;
370. Pictogram;
371. Inner area of the pictogram;
400. Road.

The invention claimed is:

1. An illumination system for a vehicle, comprising:
    a first projection device for projecting a pixelated light source defining a first projection envelope, the first projection device including an array of lighting elements emitting pixelated light to form the pixelated light source, and an output optical surface which shapes the pixelated light emitted from the array of light elements, each lighting element of the array of lighting elements being individually controllable based on at least one operating parameter; and
    a second projection device for projecting a pixelated light beam defining a second projection envelope and configured to project a pictogram, the second projecting device including a light source, a reflector having a pseudo-elliptic or pseudo-parabolic profile in a section plane, a first array of micromirrors forming a first pixelated light sub-beam, and a second array of micromirrors forming a second pixelated light sub-beam, the first pixelated light sub-beam and the second pixelated light sub-beam forming the pixelated light beam, each of the first array of micromirrors and the second array of micromirrors having an output optical surface, and the first array of micromirrors and the second array of micromirrors having an output optical surface in common,
    wherein the first projection envelope and the second projection envelope emanate from a same location on the vehicle,
    wherein said first projection envelope and said second projection envelope present an overlap area, and
    wherein a number of lighting elements of the first projection device is less than a number of micromirrors of the second projection device.

2. The system according to claim 1, wherein said second projection device is configured to project said pictogram in a positive projection mode corresponding to a luminous projection of an inner area of said pictogram.

3. The system according to claim 2, wherein said first projection device is configured to interact with said second projection device so as to produce an illumination of a part of said overlap area when said pictogram is projected by said second projection device in said positive projection mode.

4. The system according to claim 2, wherein said first projection device is configured to interact with said second projection device so as to produce reduced illumination of a part of said overlap area relative to the illumination of the inner area of said pictogram, when said pictogram is projected by said second projection device in said positive projection mode, while producing illumination in a part of said first projection envelope outside the inner area of said pictogram.

5. The system according to claim 1, wherein said second projection device is configured to project said pictogram in a negative projection mode corresponding to a luminous projection of an outer area of said pictogram.

6. The system according to claim 5, wherein said first projection device is configured to interact with said second projection device so as to produce the illumination of a part of said overlap area when said pictogram is projected by said second projection device in said negative projection mode.

7. The system according to claim 5, wherein said first projection device is configured to interact with said second projection device so as to produce reduced illumination of a part of said overlap area relative to the illumination of the outer area of said pictogram, when said pictogram is projected by said second projection device in said negative projection mode, while producing illumination in a part of said first projection envelope outside the outer area of said pictogram.

8. The system according to claim 1, wherein said array of lighting elements is an array in which a number of columns is greater than or equal to a number of rows.

9. The system according to claim 1, wherein a ratio between a number of pixels of said pixelated light source and a number of pixels of said pixelated light beam is less than 200.

10. The system according to claim 1, wherein said first projection device and said second projection device have a common output optical surface.

11. The system according to claim 1, wherein said second projection device is controlled by an electronic control unit so that said pictogram is modified according to an operating parameter.

12. The system according to claim 11, wherein said operating parameter is a parameter chosen from among: detection of a change in direction of a road, detection of a location data element, detection of precipitation, detection of a brightness of a road environment, detection of a vehicle ahead, detection of an oncoming vehicle, detection of imminent danger, detection of an object crossing a path of the vehicle, detection of an area of road works, detection of road signs, detection of deceleration, detection of an accident, detection of weather conditions, and detection of other road users.

13. An illumination method for a vehicle comprising an illumination system according to claim 1, said method comprising:
    measuring an operating parameter by a sensor;
    receiving said measured operating parameter by an electronic control unit;
    sending, via said electronic control unit, a first signal for activating and/or deactivating a part of an array of lighting elements contained in said first projection device; and
    sending, via said electronic control unit, a second signal to said second projection device, for projecting a pictogram selected from among a plurality of pictograms in a database based on the measured operating parameter.

14. The system according to claim 1, wherein the overlap area has an overlap ratio between said first projection envelope and said second projection envelope in a range from 30% to 70%.

* * * * *